April 16, 1968
E. C. BECKMAN ET AL
3,378,289
HOOD AND DECK LATCH
Filed Oct. 21, 1965
2 Sheets-Sheet 1
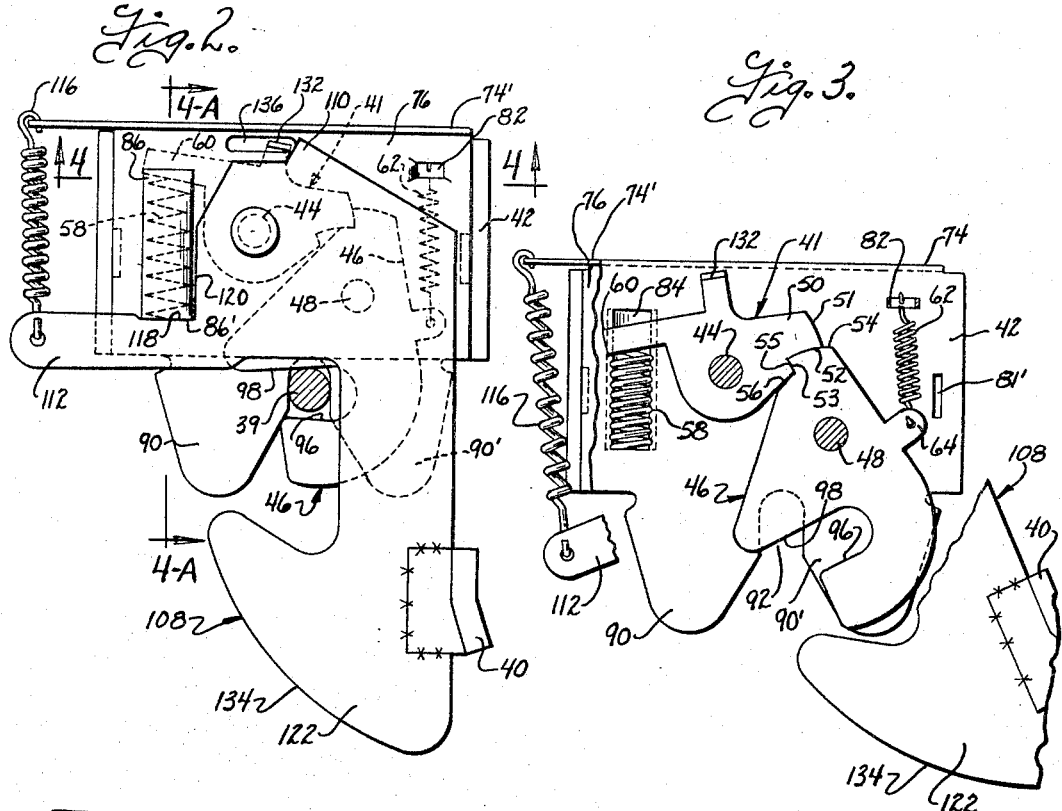
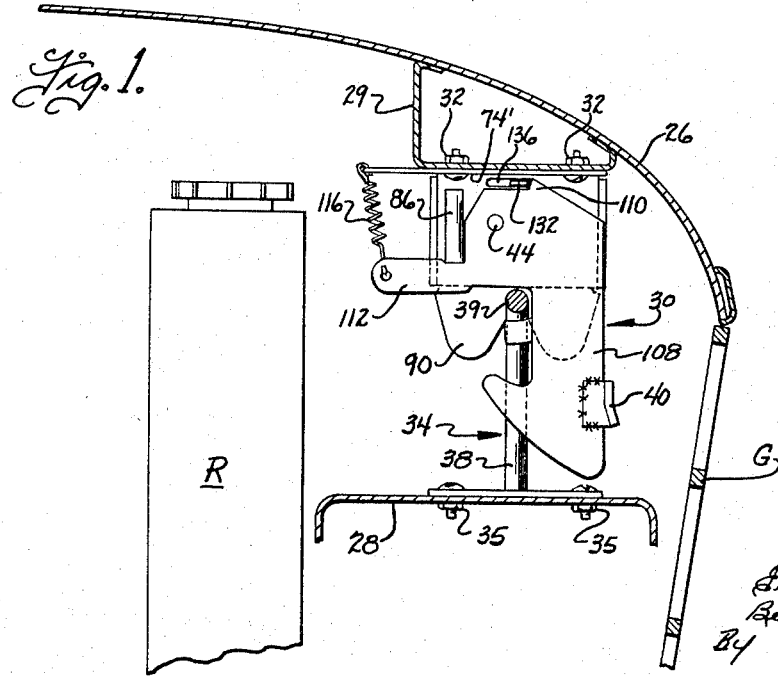

April 16, 1968  E. C. BECKMAN ET AL  3,378,289
HOOD AND DECK LATCH
Filed Oct. 21, 1965  2 Sheets-Sheet 2
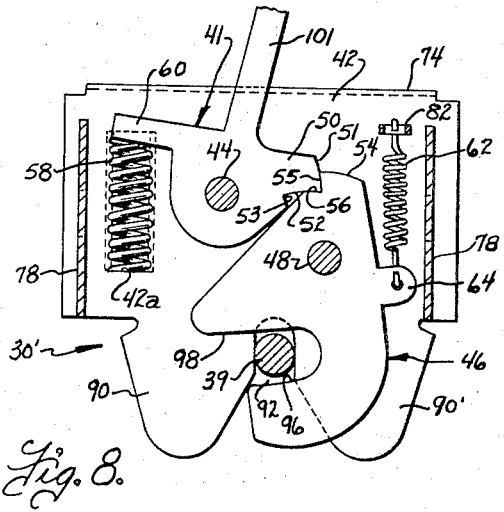
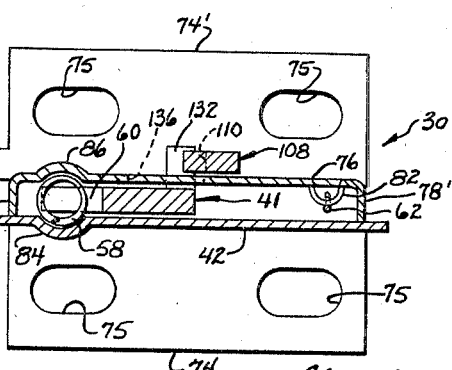
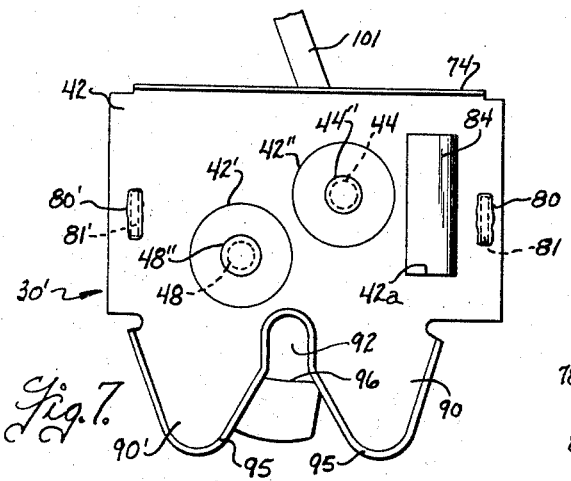
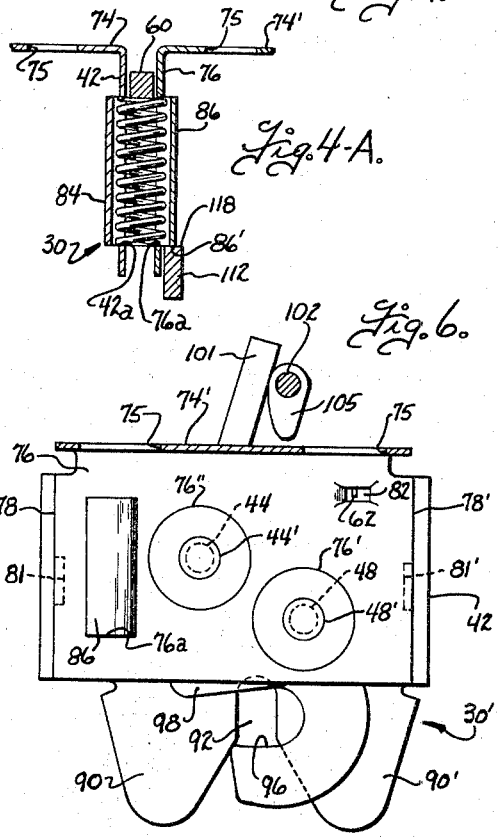
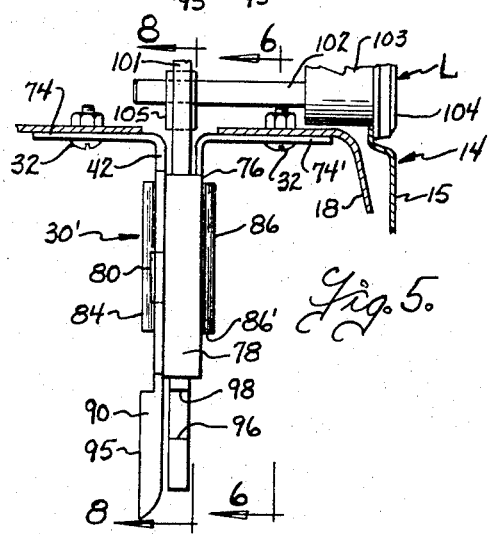
Inventor
Ernest C. Beckman
Benard D. Anderson
By
McCanna, Morsbach & Pillote
Attorneys

United States Patent Office 3,378,289
Patented Apr. 16, 1968

3,378,289
HOOD AND DECK LATCH
Ernest C. Beckman and Benard O. Anderson, Rockford, Ill., assignors to Modern Metal Products Co., Rockford, Ill., a corporation of Illinois
Filed Oct. 21, 1965, Ser. No. 499,211
4 Claims. (Cl. 292—31)

ABSTRACT OF THE DISCLOSURE

A detent and latch are pivotally mounted on a plate and have stop faces located a radial distance from the detent axis in latched position. Additional stop faces are located a radial distance from the latch axis in open position. A cover member and the plate form a cavity for a spring engaged with the detent. For use as a hood latch, a safety catch is mounted on the detent axis and operates to release the latch.

---

This invention relates to a latch mechanism which is particularly adaptable for releasably latching an automobile hood lid or rear deck lid.

It is an object of this invention to provide a latch mechanism of the above character which readily locks automatically upon closing of the hood or deck lid.

Another object is to provide a latch mechanism having a safety catch which also serves as the release lever for unlocking the mechanism.

Still another object is to provide a latch mechanism in accordance with the foregoing object and so arranged that one may be assured that the mechanism will be in position to receive a keeper when the lid is moved to a closed position.

Yet another object is to provide a latch mechanism having new and useful arrangement for the spring means which urge the various components to their relative positions.

Other objects of this invention are to provide a latch mechanism which is relatively uncomplicated, economically fabricated and assembled, thin in profile, and sturdy in construction, having components that may be for the most part fabricated from metal stampings to minimize fabrication costs and yet provide maximum strength and trouble-free operation, and which mechanism is adaptable for a number of uses in the various embodiments for automobile rear deck lid and front hood lid uses.

Other objects and advantages will appear from the following detailed description when taken in conjunction with the accompanying drawings wherein:

FIG. 1 is a sectional view of a hood lid and body element of an automobile releasably latched together by the latch mechanism of the present invention;

FIGS. 2 and 3 are front views of the mechanism of FIG. 1 on a larger scale and showing the components in a latched and unlatched position, respectively;

FIG. 4 is a sectional view taken generally along line 4—4 of FIG. 2;

FIG. 4A is a sectional view taken generally along line 4A—4A of FIG. 2;

FIG. 5 is a partial sectional view of a rear deck lid of an automobile having another embodiment of the instant invention mounted thereon;

FIG. 6 is a view taken generally along line 6—6 of FIG. 5;

FIG. 7 is a rear view of the embodiment illustrated in FIG. 6; and

FIG. 8 is a sectional view taken generally along line 8—8 of FIG. 5.

The latch mechanism herein described and illustrated comprises a latch member and a detent member preferably arranged in coplanar relationship and rotatably mounted upon a plate. The latch and detent members are each provided with faces or stops which are engageable to limit rotation of each component and to maintain them in the latched and unlatched positions. Spring means are provided to urge the latch and detent to rotate in opposite directions thereby urging the faces to engage. A cover overlies the latch and detent to form an enclosure with the plate, and the cover and plate are preferably shaped, as by stamping, to form a spring cavity to accommodate one spring. A safety catch is employed for use of the latch mechanism as, for example, to releasably secure a hood lid to a body element of an automobile for which a safety catch is normally employed. The resulting latch mechanism is characterized by a relatively thin profile.

Referring more particularly to the drawings, FIG. 1 illustrates a hood lid 26 releasably secured to a body element 28 by means of a latch mechanism, generally designated by the numeral 30. A bracket 29 is affixed to hood lid 26 and the latch mechanism is conveniently mounted on the bracket as by fasteners 32. A keeper, generally designated by the numeral 34, is mounted on body element 28 as by fasteners 35. The keeper may be of any convenient construction and, as shown, comprises a generally U-shaped configuration with parallel legs 38 connected by an intermediate portion 39. For clarity, FIG. 1 illustrates only one leg 38 and illustrates the intermediate portion in cross-section. In the embodiment of FIG. 1, latch mechanism 30 is conveniently disposed between radiator P and grill G which has openings therein for passage of the fingers to engage a finger grip portion 40 to release the latch mechanism in a manner which will hereinafter be described.

FIGS. 5–8 illustrate a modification of the apparatus of FIG. 1 particularly adapted for use on a conventional deck lid. Referring particularly to FIG. 5, the numeral 14 indicates a conventional deck lid element which may have an outer face member 15 and an inner liner member 18 spaced inwardly from the face member to form a part of the lid for reinforcing and mounting purposes. The lid 14 is hinged to the body in the usual fashion. The modified latch mechanism, generally designated by the numeral 30', is conveniently attached to inner liner member 18 as by fasteners 32. When utilized as a latch mechanism for a deck lid, a lock mechanism, generally designated by L, is provided for releasing the latch in a manner which will hereinafter be described. Many of the various components of the above described embodiments are similar and similar reference characters indicate the similar parts throughout the several views.

The above embodiments comprise a plate 42 and a cover 76 affixed thereto to conveniently define an enclosure wherein certain components of the latch mechanism are disposed. The operable manner of the embodiments is best illustrated in FIGS. 3 and 8 and attention is directed to these figures. A detent member, generally designated 41, is rotatably mounted to plate 42 as by pin 44. As illustrated, the axis of this rotation is preferably perpendicular to plate 42. A latch member, generally designated by the numeral 46, is arranged in coplanar relationship with detent 41 and mounted on plate 42 as by pin 48. The detent 41 is resiliently urged clockwise to the latching position of FIG. 8 by means of a compression-type helical spring 58 pressing against lever element 60 on the detent. The manner in which spring 58 is held in position will hereinafter be described in detail. Latch member 46 is resiliently urged counterclockwise, as viewed in FIG. 3, to the open or unlatched position by means of coil spring 62. The latter is connected under tension with a lug or dog 64 of latch 46 and a lug 82 at the other end. Lug 82 is conveniently formed in cover 76 by stamping and shaped as best seen by comparing FIGS. 4 and 6.

On the outer periphery of detent 41 is provided a stop means in the form of arm 50 for limiting movement of latch member 46 against the counterclockwise rotation urged by spring 62. Similarly, on the outer periphery of latch member 46 is a stop means for limiting clockwise rotation of detent 41 as urged by spring 58. In the latched position best illustrated in FIG. 8, detent 41 has a stop face 51 for engagement by face 55 of latch member 46 to limit the counterclockwise rotation of the latch. Simultaneously, stop face 56 on the latch engages detent face 52 to limit clockwise rotation of the detent as urged by spring 58. In this manner the forces of springs 58 and 62 are in a static condition when the mechanism is in its latched position. In the unlatched position best illustrated in FIG. 3, detent face 52 is engaged by stop face 54 on the latch to limit clockwise rotation of the detent. Likewise, latch face 55 is engaged by stop face 53 on the detent to limit counterclockwise rotation of the latch. In this manner, the spring forces are also stabilized in the unlatched position.

As stated above, cover 76 cooperates with plate 42 to provide an enclosure for the above described detent, latch, and springs 58 and 62. The cover, preferably formed by stamping, has walls 78 and 78' extending perpendicularly from its lateral edges as best seen in FIG. 4. Wall lugs 80 and 80' protrude from walls 78 and 78' respectively for insertion in corresponding slots 81 and 81' in plate 42 (FIG. 7). The ends of the wall lugs are upset in any convenient manner to secure the cover to the plate. To further secure the cover member to the plate, pins 44 and 48 may be provided with heads 44', 44'', 48', and 48'', as best seen in FIGS. 6 and 7. To assure that the detent 41 and latch 46 will easily rotate between the plate and cover, inwardly extending circular offset portions 42' and 42'' are provided in plate 42 (FIG. 7) and correspond with inwardly extending circular offset portions 76' and 76'' in cover 76 (FIG. 6). By such arrangement, the detent and latch are spaced from the inner surfaces of the plate and cover to reduce friction when the detent and latch rotatably move in assuming the latched and unlatched positions.

In further considering the operable manner of the illustrated embodiments in FIGS. 3 and 8, it can be seen that lever element 60 moves to depress helical compression spring 58 as detent 41 is caused to rotate counterclockwise. To accommodate spring 58, plate 42 and cover 76 are provided with complementary cylindrical portions 84 and 86 respectively to define a cavity wherein the compression spring is laterally confined, as best seen in FIG. 4A. Cylindrical portions 84 and 86 are formed by the stamping operation and, by such deformation, lower edges 42a and 76a are defined in plate 42 and 76 respectively (see FIG. 4A). The lower end of compression spring 58 rests against lower edges 42a and 76a and the upper end of spring 58 rests against the under surface of lever element 60. In this manner the compression spring is longitudinally confined.

Attachment flanges 74 and 74', best seen in FIGS. 4 and 5, conveniently extend perpendicularly from plate 42 and cover 76, respectively. For mounting the latch mechanism as by fasteners 32, as aforedescribed, a plurality of openings 75 are provided in the flanges, the openings being elongated for adjustment of the position of the latch with respect to the keep in accordance with the usual practice.

Plate 42 has bifurcated end portions 90 and 90' defining a keeper engaging slot 92 therebetween and wherein intermediate portion 39 of keeper 34 is positioned when the latch mechanism is in latched position. During the stamping operation, edge 95 (FIG. 7) of the bifurcated end of the plate is formed laterally to add rigidity to the structure. To operably secure the latch mechanism to the keeper, latch 46 is provided with a bifurcated end portion defining a keeper retaining face 96 and a striker face 98. When keeper portion 39 strikes face 98 during full closing movement of the lid, the latch is thereby cammed or rotated to full latching position (FIG. 8) and becomes locked by detent 41. At this point, the keeper retaining face 96 is moved behind the keeper portion 39 to retain the same in the keeper engaging slot 92. As the latch is rotated clockwise by movement of keeper portion 39 into slot 92, latch stop face 54 is rotated out of engagement with detent face 52. To accommodate this movement, faces 52 and 54 are preferably concentric with the pin 48 or, in other words, faces 52 and 54 are located a radial distance from the axis of pin 48. Thereafter, compression spring 58 rotates detent 41 clockwise to bring stop face 51 into engagement with latch face 55, and detent face 52 into engagement with stop 56. For this purpose, stop face 51 and latch face 55 are preferably concentric with pin 44, or located a radial distance from the axis thereof.

Release of the latch mechanism is accomplished by rotating detent 41 counterclockwise, as view in FIGS. 3 and 8, thereby allowing tension spring 62 to rotate the latch member to open position. For this purpose an actuating means is provided on detent 41 and, in the embodiment illustrated in FIGS. 5–8, an actuating arm 101 extends from detent 41 through the slot between the cover and the plate to a point externally thereof for actuation by a cylinder lock mechanism, generally designated L. A typical cylinder lock arrangement is illustrated in FIG. 5 and comprises a rod 102 extending to a cylinder lock 103 mounted on the deck lid 14 and having a portion 104 thereof exposed on the exterior of the lid for the reception of a key. A cam 105 is conveniently mounted on rod 102 in any convenient manner and rotation of rod 102 serves to rotate the cam which moves actuating arm 101 thereby rotating the detent and releasing the latch member.

When used to secure a hood lid of an automobile, as in FIG. 1, the latch mechanism preferably includes a safety catch generally designated 108, and the instant invention contemplates a particularly advantageous cooperation between the safety catch and the actuating means. As best shown in FIGS. 2–4, detent 41 is provided with a trip portion 132 extending perpendicularly from the detent through an aperture 136 in cover 76 and extending to a point spaced from the cover. The aperture is conveniently shaped to accommodate movement of the trip portion 132 therein. In the advantageous arrangement best illustrated in FIG. 2, safety catch 108 is preferably mounted on pin 44 adjacent the side of the housing through which trip portion 132 extends whereby the safety catch is rotatable about the same axis as detent 41. The safety catch is normally biased clockwise to the position shown in FIG. 2 by means of a tension spring 116 attached to an arm 112 of the safety catch at one end and to cover attachment flange 74' at the other end. To cause detent 41 to rotate counterclockwise and disengage the latch mechanism from the keeper, finger grip portion 40 is mounted on depending hook portion 122 of the safety catch. Pulling on the finger grip portion rotates safety catch 108 counterclockwise about pin 44 causing a trip shoulder 110 to move trip portion 132 to the position illustrated in FIG. 3. At this point, stop face 51 is disengaged from latch face 55 allowing spring 62 to move the latch 46 to open position. The above described arrangement also is advantageous should the latch 46 be in latched position when it is desired that the hood be closed. Should this occur, safety catch 108 will automatically retract the latch to the open position since lower arcuate edge 134 of hook portion 122 will strike intermediate portion 39 of the keeper and cam the safety catch outwardly thereby rotating it counterclockwise and causing trip shoulder 110 to move trip portion 132. This will move the latch to the unlatched position in the manner described above. It can be seen that this arrangement serves to prevent any accidental damage to the latch mechanism should the hood lid 26 be lowered on body element 28 when the latch is in the latched position. Means is provided to assure that the safety catch 108 is disposed in the proper position for such biasing. To stop the clockwise rotation of the safety member as urged by tension spring 116, arm 112 is provided with a face 118 which engages a projecting lower edge or shoulder 86' of cylindrical portion 86 which is also formed in the stamping operation. Thus the cylindrical portion cooperates with the safety catch to properly position the latter for the biasing operation.

In further considering the embodiments illustrated, it can be seen that most of the parts are interchangeable and that the embodiment illustrated in FIGS. 1-4 can be converted to the embodiment illustrated in FIGS. 5-8 merely by removing the safety catch 108 and providing a detent with arm 101 in lieu of trip portion 132.

While preferred embodiments of this invention have been described and illustrated, this has been done by way of illustration and not limitation and the invention should not be limited except as required by the appended claims.

We claim:

1. A latch mechanism for releasably latching a hinged lid element to a body element and comprising a keeper for mounting on one of said elements, a plate of stamped and formed sheet metal, a latch member pivotally mounted on the plate for movement between a latched position engaging the keeper and an open position, a latch spring for urging the latch member to open position, a detent member pivotally mounted on the plate and having a detent stop means for engaging the latch member, a latch stop means on the latch member for engagement by the detent stop means to retain the latch member in latched position against the force of the latch spring, a cover member overlying said detent member, a separate compression spring for urging the detent stop means against the latch member, said cover member and said plate shaped for laterally and longitudinally confining the compression spring, the compression spring confining shape of the cover member including an outwardly extending portion defining a shoulder adjacent one end thereof, an actuating arm on the detent member for rotating the detent member against the force of the compression spring to release the latch member to its open position, a manually operable safety catch overlying the cover member and pivotally mounted in a plane generally parallel to said latch member for movement between one position for contact by the keeper and a release position, an arm on the safety catch for engaging the shoulder when the safety catch is in said one position to limit movement thereof, and a safety catch spring for urging the safety catch to said one position.

2. A latch mechanism for releasably latching a hinged lid element to a body element and comprising a keeper for mounting on one of said elements, a plate of stamped and formed sheet metal for mounting on the other of said elements, a flat latch member pivotally mounted on the plate about a first axis generally normal to the plate for movement between a latched position engaging the keeper and an open position, first resilient means for urging the latch member to open position, a flat detent member pivotally mounted on the plate about a second axis generally normal to the plate and substantially coplanar with the latch member, a cover member of stamped and formed sheet metal overlying said latch member, said first resilient means, and said detent member, a helical compression spring for urging the detent stop means against the latch member and having an outer diameter greater than the distance between the plate and cover member, said cover member and said plate having complementary portions overlying each other shaped to form an elongate spring cavity for laterally and longitudinally confining the compression spring, each said complementary portion characterized by a generally arcuate cross section, a first detent stop face on the detent member, a first latch stop face on the latch member for engagement by the first detent stop face to retain the latch member in the latched position against the force of said first resilient means, said first detent stop face and said first latch stop face being a radial distance from said second axis when in the latched position, a second latch stop face on the latch member, a second detent stop face on the detent member for engagement by the second latch stop face to hold the detent member in open position against the force of said compression spring, said second detent stop face and said second latch stop face being a radial distance from said first axis when in the open position, a third detent stop face on the detent member for engaging the first latch stop face in the open position to limit rotation of the latch member as urged by the first resilient means, a third latch stop face for engaging the second detent stop face in the latched position to limit rotation of the detent member as urged by the compression spring, a laterally extending actuating arm on the detent member for rotating the detent member against the force of the compression spring to release the latch member to its open position, said cover member having an opening for passage of the actuating arm and said actuating arm extending to a point spaced from the cover member, a safety catch mounted adjacent said cover member for pivotal movement about said second axis between one position for contact by the keeper and a release position, said safety catch having a portion engageable with the actuating arm to rotate the detent member upon movement of the safety catch to said release position, said safety catch having a cam face disposed in the path of the keeper as it moves toward latched position with the latch member for moving the safety catch from said one position to said release position, said spring cavity portion of the cover member defining an outwardly extending shoulder adjacent one end of the portion, an arm on the safety catch for engaging the shoulder when the safety catch is in said one position to limit movement thereof, and second resilient means connected to said arm for urging the safety catch to said one position.

3. In a latch mechanism for releasably latching a hinged lid element to a body element, and including: a keeper for mounting on one of said elements, a plate of stamped and formed sheet metal for mounting on the other of said elements, a flat latch member pivotally mounted on the plate about a first axis generally normal to the plate for movement between a latched position engaging the keeper and an open position, a flat detent member generally coplanar with the latch member and pivotally mounted on the plate about a second axis generally parallel to the first axis, spring means for resiliently urging the latch member to rotate to the open position and the detent member to rotate to a position for holding the latch member in latched position, and means for moving the detent member against the force of the spring means to release the latch member to the open position, the improvement comprising: a first detent stop face (51) on the detent member, a first latch stop face (55) on the latch member for engagement by the first detent stop face to retain the latch member in the latched position against the force of said spring means, said first detent stop face (51) and said first latch stop face (55) being a radial distance from said second axis when in the latched position, a second latch stop face (54) on the latch member, a second detent stop face (52) on the detent member for engagement by the second latch stop face to hold the detent member in the open position against the force of said spring means, said second detent stop face (52) and said second latch stop face (54) being a radial distance from said first axis when in the open position, a third detent stop face (53) on the detent member for engaging the first latch stop face (55) in the open position to limit rotation of the latch member as urged by the spring means, and a third latch stop face (56) for engaging the second detent stop face (52) in the latched position to limit rotation of the detent member as urged by the spring means.

4. A latch mechanism as set forth in claim 3 including: a safety catch pivotally mounted for movement about said second axis between one position for contact by the keeper and a release position, an actuating arm extending laterally from the detent for engagement by the safety catch and operable to move the detent member to the open position when the safety catch is moved to release position.

References Cited

UNITED STATES PATENTS

| 2,697,625 | 12/1954 | Krause. | |
| 2,877,038 | 3/1959 | Kramer. | |
| 3,010,749 | 11/1961 | Brissette et al. | 292—129 X |
| 3,041,100 | 6/1962 | Brady | 292—336.3 |
| 3,236,551 | 2/1966 | Nash | 292—11 |

FOREIGN PATENTS 840,813  7/1960  Great Britain.

MARVIN A. CHAMPION, *Primary Examiner.*

EDWARD C. ALLEN, FRANCIS K. ZUGEL,
*Examiners.*

JOHN R. MOSES, *Assistant Examiner.*